(12) United States Patent
Tolentino et al.

(10) Patent No.: US 9,889,822 B2
(45) Date of Patent: Feb. 13, 2018

(54) WINDSHIELD WIPER CONNECTOR AND ASSEMBLY

(71) Applicant: Pylon Manufacturing Corp., Deerfiled Beach, FL (US)

(72) Inventors: Vambi Raymundo Tolentino, Coconut Creek, FL (US); Robert Peter Peers, Boca Raton, FL (US)

(73) Assignee: Pylon Manufacturing Corp., Deerfield Beach, FL (US)

( * ) Notice: Subject to any disclaimer, the term of this patent is extended or adjusted under 35 U.S.C. 154(b) by 0 days.

(21) Appl. No.: 15/359,271

(22) Filed: Nov. 22, 2016

(65) Prior Publication Data

US 2017/0072912 A1 Mar. 16, 2017

Related U.S. Application Data

(63) Continuation of application No. 14/200,792, filed on Mar. 7, 2014, now Pat. No. 9,505,380.

(51) Int. Cl.
*B60S 1/40* (2006.01)
*B60S 1/38* (2006.01)

(52) U.S. Cl.
CPC ............. *B60S 1/4064* (2013.01); *B60S 1/387* (2013.01); *B60S 1/4003* (2013.01); *B60S 1/4048* (2013.01); *B60S 1/4045* (2013.01); *B60S 2001/4054* (2013.01)

(58) Field of Classification Search
CPC ...... B60S 1/4048; B60S 1/4064; B60S 1/387; B60S 2001/4054
See application file for complete search history.

(56) References Cited

U.S. PATENT DOCUMENTS

| D56,762 S | 12/1920 | Minier |
| 2,310,751 A | 2/1943 | Scinta |
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |

(Continued)

FOREIGN PATENT DOCUMENTS

| AR | 206463 A1 | 7/1976 |
| AU | 409933 B2 | 2/1971 |

(Continued)

OTHER PUBLICATIONS

International Search Report dated Oct. 19, 2012 for PCT/US2012/048843 filed Jul. 30, 2012.

(Continued)

*Primary Examiner* — Michael Jennings
(74) *Attorney, Agent, or Firm* — Cozen O'Connor

(57) ABSTRACT

Novel connectors and wiper blade assemblies including same for securing windshield wiper blades and arms are described, including those that accommodate side-saddle wiper arms. A wiper blade connector may have a mounting portion comprising a wiper blade securing element, the wiper securing element being capable of securing a wiper blade, and a side-saddle portion comprising two side walls, a top wall and a bottom surface, defining a receiving cavity, said top wall having a cantilever with a locking tab.

20 Claims, 8 Drawing Sheets

(56) References Cited

U.S. PATENT DOCUMENTS

| | | |
|---|---|---|
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,621 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,127,912 A | 12/1978 | Deibel et al. |
| 4,127,916 A | 12/1978 | Van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Netsch |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |

(56) References Cited

U.S. PATENT DOCUMENTS

| | | |
|---|---|---|
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,440 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| 5,392,612 A | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S * | 12/1998 | Kim .......................... D12/220 |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paolo et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |

(56) References Cited

U.S. PATENT DOCUMENTS

| | | |
|---|---|---|
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Len |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weilet et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Gafrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |

(56) References Cited

U.S. PATENT DOCUMENTS

| | | | |
|---|---|---|---|
| D593,923 | S | 6/2009 | Bratec et al. |
| 7,543,353 | B2 | 6/2009 | Ko |
| 7,552,502 | B2 | 6/2009 | Kagawa et al. |
| D596,102 | S | 7/2009 | Kim |
| 7,559,110 | B1 | 7/2009 | Kotlarski et al. |
| D601,077 | S | 9/2009 | Kim |
| 7,581,280 | B2 | 9/2009 | Op't Roodt et al. |
| 7,581,887 | B2 | 9/2009 | Zimmer |
| 7,584,520 | B2 | 9/2009 | Hussaini et al. |
| 7,596,479 | B2 | 9/2009 | Weiler et al. |
| 7,603,741 | B2 | 10/2009 | Verelst et al. |
| 7,603,742 | B2 | 10/2009 | Nakano et al. |
| 7,607,194 | B2 | 10/2009 | Weber et al. |
| 7,614,499 | B2 | 11/2009 | Mueller |
| 7,621,016 | B2 | 11/2009 | Verelst et al. |
| 7,628,560 | B2 | 12/2009 | Westermann et al. |
| 7,634,833 | B2 | 12/2009 | Boland et al. |
| 7,636,980 | B2 | 12/2009 | Nakano |
| D608,717 | S | 1/2010 | Aglassinger |
| D610,518 | S | 2/2010 | Aglassinger |
| D610,519 | S | 2/2010 | Aglassinger |
| D610,520 | S | 2/2010 | Aglassinger |
| D611,809 | S | 3/2010 | Borgerson et al. |
| 7,669,276 | B2 | 3/2010 | Verelst et al. |
| 7,687,565 | B2 | 3/2010 | Geilenkirchen |
| 7,690,073 | B2 | 4/2010 | Marmoy et al. |
| 7,690,509 | B2 | 4/2010 | Herring et al. |
| 7,699,169 | B2 | 4/2010 | Lewis |
| D615,918 | S | 5/2010 | Kim |
| 7,707,680 | B2 | 5/2010 | Hawighorst et al. |
| 7,716,780 | B2 | 5/2010 | Scholl et al. |
| 7,718,509 | B2 | 5/2010 | Endo et al. |
| 7,743,457 | B2 | 6/2010 | Metz |
| 7,748,076 | B2 | 7/2010 | Weiler et al. |
| D621,322 | S | 8/2010 | Lee et al. |
| 7,780,214 | B2 | 8/2010 | Kraus et al. |
| 7,788,761 | B2 | 9/2010 | Weiler et al. |
| 7,793,382 | B2 | 9/2010 | Van De Rovaart |
| 7,797,787 | B2 | 9/2010 | Wilms et al. |
| 7,805,800 | B2 | 10/2010 | Wilms et al. |
| 7,810,206 | B2 | 10/2010 | Weiler et al. |
| 7,814,611 | B2 | 10/2010 | Heinrich et al. |
| D627,288 | S | 11/2010 | Lee |
| 7,823,953 | B2 | 11/2010 | Haas |
| 7,832,045 | B2 | 11/2010 | Weiler et al. |
| 7,832,047 | B2 | 11/2010 | Herinckx et al. |
| 7,836,542 | B2 | 11/2010 | Dietrich et al. |
| 7,849,553 | B2 | 12/2010 | Weiler et al. |
| D632,557 | S | 2/2011 | Clamagirand et al. |
| 7,886,401 | B2 | 2/2011 | Weber et al. |
| 7,891,043 | B2 | 2/2011 | Kraus et al. |
| 7,891,044 | B2 | 2/2011 | Fink et al. |
| 7,895,702 | B2 | 3/2011 | Tisch et al. |
| 7,895,703 | B2 | 3/2011 | Ina et al. |
| 7,898,141 | B2 | 3/2011 | Hurst et al. |
| 7,899,596 | B2 | 3/2011 | Zimmer |
| 7,908,703 | B2 | 3/2011 | Van Bealen |
| 7,908,704 | B2 | 3/2011 | Kraemer |
| 7,921,503 | B1 | 4/2011 | Chiang |
| 7,921,504 | B1 | 4/2011 | Chiang |
| 7,921,506 | B2 | 4/2011 | Baek et al. |
| 7,926,659 | B2 | 4/2011 | Kim |
| 7,930,796 | B2 | 4/2011 | Weiler et al. |
| D637,132 | S | 5/2011 | Kim |
| 7,937,798 | B2 | 5/2011 | Fink et al. |
| 7,941,891 | B2 | 5/2011 | Breesch |
| 7,941,892 | B2 | 5/2011 | Kraus et al. |
| 7,945,985 | B2 | 5/2011 | Stubner |
| 7,945,987 | B2 | 5/2011 | Verelst et al. |
| 7,950,717 | B2 | 5/2011 | Metz |
| 7,962,787 | B2 | 6/2011 | Camilleri et al. |
| 7,966,689 | B2 | 6/2011 | Rovaart et al. |
| 7,971,312 | B2 | 7/2011 | Crabee et al. |
| 7,975,849 | B2 | 7/2011 | Kim |
| 7,979,950 | B2 | 7/2011 | Boland |
| 7,989,955 | B2 | 8/2011 | Yagi |
| 7,989,995 | B2 | 8/2011 | Reith et al. |
| 7,992,248 | B2 | 8/2011 | Koppen et al. |
| 7,996,953 | B2 | 8/2011 | Braun et al. |
| D644,925 | S | 9/2011 | Jaworski |
| 8,020,246 | B2 | 9/2011 | Bauer et al. |
| 8,020,248 | B2 | 9/2011 | Hasegawa |
| 8,020,249 | B2 | 9/2011 | Masuda et al. |
| 8,024,836 | B2 | 9/2011 | Moll et al. |
| 8,026,645 | B2 | 9/2011 | Stubner et al. |
| D647,451 | S | 10/2011 | Lin |
| 8,042,690 | B2 | 10/2011 | Lewis |
| D647,795 | S | 11/2011 | Eaton et al. |
| 8,051,526 | B2 | 11/2011 | Summerville et al. |
| 8,060,976 | B2 | 11/2011 | Mayer et al. |
| 8,069,528 | B2 | 12/2011 | Verelst et al. |
| 8,076,807 | B2 | 12/2011 | Bohn et al. |
| D651,509 | S | 1/2012 | Methe et al. |
| 8,096,013 | B2 | 1/2012 | Eschenbrenner et al. |
| 8,099,823 | B2 | 1/2012 | Kraemer et al. |
| 8,104,134 | B2 | 1/2012 | Ritt |
| 8,104,136 | B2 | 1/2012 | Carangelo |
| 8,117,710 | B2 | 2/2012 | Kraus et al. |
| 8,125,111 | B2 | 2/2012 | Bohn et al. |
| 8,141,198 | B2 | 3/2012 | Wilms et al. |
| 8,148,467 | B2 | 4/2012 | Pieters et al. |
| 8,151,656 | B2 | 4/2012 | Nicgorski, II |
| 8,156,604 | B2 | 4/2012 | Kraus et al. |
| 8,156,605 | B2 | 4/2012 | Dietrich et al. |
| 8,165,796 | B2 | 4/2012 | Hoetzer |
| D658,494 | S | 5/2012 | Raimer et al. |
| 8,166,605 | B2 | 5/2012 | Lee |
| 8,169,791 | B2 | 5/2012 | Wolf et al. |
| 8,180,518 | B2 | 5/2012 | Petricoin, Jr. |
| 8,181,305 | B2 | 5/2012 | Boos |
| 8,181,306 | B2 | 5/2012 | Merkel |
| 8,181,307 | B2 | 5/2012 | Wilms et al. |
| 8,181,308 | B2 | 5/2012 | Kwon et al. |
| 8,186,002 | B2 | 5/2012 | Kinnaert et al. |
| 8,191,201 | B2 | 6/2012 | De Block et al. |
| 8,191,700 | B2 | 6/2012 | Kim |
| 8,196,253 | B2 | 6/2012 | Barlas |
| 8,196,254 | B2 | 6/2012 | Mahfoudh et al. |
| 8,196,255 | B2 | 6/2012 | De Block et al. |
| 8,205,290 | B2 | 6/2012 | Weiler et al. |
| 8,205,291 | B2 | 6/2012 | Eschenbrenner et al. |
| 8,214,965 | B2 | 7/2012 | Volz et al. |
| 8,230,547 | B2 | 7/2012 | Wilms et al. |
| 8,234,746 | B2 | 8/2012 | Lutterodt et al. |
| 8,245,350 | B2 | 8/2012 | Van De Rostyne et al. |
| 8,256,851 | B2 | 9/2012 | Pelosse |
| 8,261,403 | B2 | 9/2012 | Ehde |
| 8,261,405 | B2 | 9/2012 | Kim et al. |
| 8,261,628 | B2 | 9/2012 | Moecklin et al. |
| 8,266,759 | B2 | 9/2012 | Braun et al. |
| 8,272,096 | B2 | 9/2012 | Wilms et al. |
| 8,272,360 | B2 | 9/2012 | Hartmann et al. |
| 8,286,533 | B2 | 10/2012 | Hurst et al. |
| 8,294,327 | B2 | 10/2012 | Chaumet et al. |
| D671,827 | S | 12/2012 | Raimer et al. |
| 8,322,456 | B2 | 12/2012 | Pozgay et al. |
| 8,327,500 | B2 | 12/2012 | De Block et al. |
| 8,328,011 | B2 | 12/2012 | Skurdalsvold et al. |
| 8,333,093 | B2 | 12/2012 | Kleckner et al. |
| D674,733 | S | 1/2013 | Lee |
| 8,341,799 | B2 | 1/2013 | Koppen et al. |
| 8,347,449 | B2 | 1/2013 | Genet et al. |
| 8,356,520 | B2 | 1/2013 | Hurst et al. |
| 8,359,701 | B2 | 1/2013 | De Block et al. |
| 8,361,595 | B2 | 1/2013 | Van De Rostyne et al. |
| 8,370,986 | B2 | 2/2013 | Wilms et al. |
| 8,370,987 | B2 | 2/2013 | Ritt |
| 8,370,988 | B2 | 2/2013 | Kraus et al. |
| 8,373,322 | B2 | 2/2013 | Wegner et al. |
| 8,375,503 | B2 | 2/2013 | Aznag |
| 8,381,348 | B2 | 2/2013 | Egner-Walter et al. |
| 8,381,349 | B2 | 2/2013 | Ku |
| 8,381,350 | B2 | 2/2013 | Op't Roodt et al. |
| 8,397,340 | B2 | 3/2013 | Weiler et al. |

(56) References Cited

U.S. PATENT DOCUMENTS

| | | |
|---|---|---|
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt et al. |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mili et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |
| 9,272,676 B2 | 3/2016 | Heger et al. |
| 9,505,380 B2 * | 11/2016 | Tolentino ............ B60S 1/4064 |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| 2001/0013236 A1 | 8/2001 | Weyerstall et al. |

(56) References Cited

U.S. PATENT DOCUMENTS

| | | |
|---|---|---|
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Bealen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0067678 A1 | 3/2013 | Ehde |
| 2013/0104334 A1 | 5/2013 | Depondt |
| 2013/0117957 A1 | 5/2013 | Ku |
| 2013/0125333 A1 | 5/2013 | Tolentino et al. |
| 2013/0152323 A1* | 6/2013 | Chien ................ B60S 1/3849 15/250.32 |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0185889 A1 | 7/2013 | Tolentino et al. |
| 2013/0192015 A1 | 8/2013 | Tolentino et al. |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0219649 A1* | 8/2013 | Tolentino ............ B60S 1/3801 15/250.32 |
| 2013/0227809 A1 | 9/2013 | Tolentinto et al. |
| 2013/0227810 A1 | 9/2013 | Tolentinto et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0082875 A1 | 3/2014 | Peers et al. |
| 2014/0115811 A1 | 5/2014 | Kim et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |

(56) References Cited

U.S. PATENT DOCUMENTS

| | | | |
|---|---|---|---|
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0283325 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0135468 A1 | 5/2015 | Kim |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentinto et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0159323 A1 | 6/2016 | Tolentino et al. |
| 2016/0280186 A1 | 9/2016 | Peers et al. |
| 2016/0375867 A1 | 12/2016 | Tolentino et al. |
| 2017/0057464 A1 | 3/2017 | Tolentinto et al. |
| 2017/0113656 A1 | 4/2017 | Tolentino |

FOREIGN PATENT DOCUMENTS

| | | | |
|---|---|---|---|
| AU | 410701 B2 | 2/1971 |
| AU | 649730 B2 | 6/1994 |
| AU | 729371 C | 7/2001 |
| AU | 741730 B2 | 12/2001 |
| AU | 762557 B2 | 6/2003 |
| AU | 770944 B2 | 3/2004 |
| AU | 2003257828 A1 | 3/2004 |
| AU | 780818 B2 | 4/2005 |
| AU | 2006100618 A4 | 8/2006 |
| AU | 2006241297 A1 | 6/2007 |
| AU | 2006203445 A1 | 10/2007 |
| AU | 2008100641 A4 | 8/2008 |
| AU | 2009238193 A1 | 10/2009 |
| AU | 2009324257 A1 | 8/2010 |
| AU | 2010294766 A1 | 2/2012 |
| BR | 8304484 A | 4/1984 |
| BR | 8604381 A | 5/1987 |
| BR | 8707390 A | 11/1988 |
| BR | 8903473 A | 3/1990 |
| BR | 8907154 A | 2/1991 |
| BR | 9005080 A | 8/1991 |
| BR | 9105809 A | 8/1992 |
| BR | 9200129 A | 10/1992 |
| BR | 0007263 A | 10/2001 |
| BR | 0106665 A | 4/2002 |
| BR | U106667 A | 4/2002 |
| BR | 0306135 A | 10/2004 |
| BR | PI0411532 A | 8/2006 |
| BR | PI0506158 A | 10/2006 |
| BR | PI0007263 | 1/2009 |
| BR | PI0519259 | 1/2009 |
| BR | 0006164 B1 | 8/2009 |
| BR | 0006917 B1 | 8/2009 |
| BR | PI0606903 A2 | 8/2009 |
| BR | PI0901324 | 4/2010 |
| BR | PI0006963 | 9/2010 |
| BR | PI0706762 A2 | 4/2011 |
| BR | PI1000961 | 6/2011 |
| BR | PI0621265 A2 | 12/2011 |
| CA | 954258 | 9/1974 |
| CA | 966609 | 4/1975 |
| CA | 1038117 | 9/1978 |
| CA | 1075414 | 4/1980 |
| CA | 1124462 | 6/1982 |
| CA | 1184712 | 4/1985 |
| CA | 1257059 | 7/1989 |
| CA | 1263803 | 12/1989 |
| CA | 2027227 | 4/1991 |
| CA | 1289308 | 9/1991 |
| CA | 2037400 | 2/1992 |
| CA | 2093956 | 4/1992 |
| CA | 2079846 | 7/1993 |
| CA | 2118874 | 9/1994 |
| CA | 2156345 | 2/1996 |
| CA | 2174030 | 5/1997 |
| CA | 2260175 | 1/1998 |
| CA | 2220462 | 7/1998 |
| CA | 2243143 | 1/1999 |
| CA | 2344888 | 4/2000 |
| CA | 2414099 | 1/2002 |
| CA | 2472914 | 8/2003 |
| CA | 2487799 | 12/2003 |
| CA | 2500891 A1 | 4/2004 |
| CA | 2515071 A1 | 8/2004 |
| CA | 2242776 | 7/2005 |
| CA | 2553977 | 9/2005 |
| CA | 2554048 A1 | 9/2005 |
| CA | 2514372 | 1/2006 |
| CA | 2574330 | 2/2006 |
| CA | 2523315 | 4/2006 |
| CA | 2541641 | 4/2006 |
| CA | 2522729 | 6/2006 |
| CA | 2598104 | 9/2006 |
| CA | 2550409 | 11/2006 |
| CA | 2568561 | 5/2007 |
| CA | 2569175 | 5/2007 |
| CA | 2569176 | 5/2007 |
| CA | 2569977 | 6/2007 |
| CA | 2560155 | 9/2007 |
| CA | 2645821 | 10/2007 |
| CA | 2649474 | 11/2007 |
| CA | 2649760 | 11/2007 |
| CA | 2651069 | 11/2007 |
| CA | 2590443 | 4/2008 |
| CA | 2631513 | 5/2008 |
| CA | 2574242 | 7/2008 |
| CA | 2617013 | 11/2008 |
| CA | 2628517 | 4/2009 |
| CA | 2671767 | 1/2010 |
| CA | 2789431 A1 | 8/2011 |
| CA | 2809243 A1 | 3/2012 |
| CA | 2809292 A1 | 3/2012 |
| CA | 2809947 A1 | 3/2012 |
| CA | 2831801 A1 | 10/2012 |
| CA | 2835703 A1 | 11/2012 |
| CA | 2843527 A1 * | 1/2013 | ............ B60S 1/4003 |
| CA | 2843637 A1 | 2/2013 |
| CA | 2843644 A1 | 2/2013 |
| CA | 2797693 A1 | 5/2013 |
| CA | 147027 S | 6/2013 |
| CA | 147028 S | 6/2013 |
| CA | 2799267 A1 | 6/2013 |
| CA | 2740384 C | 7/2013 |
| CA | 2865292 A1 | 8/2013 |
| CA | 2906863 A1 | 9/2014 |
| CA | 2898928 A1 | 1/2017 |
| CA | 2865295 C | 3/2017 |
| CL | 2014002239 A1 | 5/2015 |
| CL | 2014002241 A1 | 5/2015 |
| CL | 2015002093 A1 | 4/2016 |
| CN | 101983148 A | 3/2011 |
| CN | 202593459 U | 12/2012 |
| CN | 102963337 A | 3/2013 |
| CN | 102991462 A | 3/2013 |
| CN | 102991466 A | 3/2013 |
| CN | 103101514 A | 5/2013 |
| CN | 103101516 A | 5/2013 |
| CN | 103108782 A | 5/2013 |
| CN | 103183008 A | 7/2013 |
| CN | 103183009 A | 7/2013 |
| CN | 103223923 A | 7/2013 |

(56) References Cited

FOREIGN PATENT DOCUMENTS

| | | |
|---|---|---|
| CN | 103228498 A | 7/2013 |
| CO | 7141449 A2 | 12/2014 |
| CO | 7141460 A2 | 12/2014 |
| DE | 2309063 | 8/1974 |
| DE | 2311293 | 9/1974 |
| DE | 2353368 | 5/1975 |
| DE | 3222864 | 12/1983 |
| DE | 3919050 A1 | 12/1990 |
| DE | 4439275 A1 | 5/1995 |
| DE | 19650929 | 6/1998 |
| DE | 19734843 | 2/1999 |
| DE | 19745460 | 4/1999 |
| DE | 19814609 | 10/1999 |
| DE | 10054287 | 5/2002 |
| DE | 10228494 A1 | 1/2004 |
| DE | 10320930 | 11/2004 |
| DE | 10343571 A1 | 4/2005 |
| DE | 102004019157 | 11/2005 |
| DE | 102004061088 | 6/2006 |
| DE | 102005019389 | 11/2006 |
| DE | 102005062462 A1 | 6/2007 |
| DE | 102006057024 | 6/2008 |
| DE | 102007030169 | 1/2009 |
| DE | 102007051549 | 4/2009 |
| DE | 102008042516 | 5/2009 |
| DE | 102008001045 | 10/2009 |
| DE | 102008021457 | 11/2009 |
| DE | 102008002447 | 12/2009 |
| DE | 102008049269 | 4/2010 |
| DE | 102008049270 | 4/2010 |
| DE | 102009000483 | 4/2010 |
| DE | 102009001025 | 8/2010 |
| DE | 102010012983 | 2/2011 |
| DE | 102009029469 | 3/2011 |
| DE | 102009029470 | 3/2011 |
| DE | 102009048212 | 4/2011 |
| DE | 102010016348 | 4/2011 |
| DE | 102010041152 A1 | 5/2011 |
| DE | 102010003269 | 9/2011 |
| DE | 202011005213 | 9/2011 |
| DE | 202011100429 | 9/2011 |
| DE | 102010003645 | 10/2011 |
| DE | 102010028102 | 10/2011 |
| DE | 102010029107 | 11/2011 |
| DE | 102010030880 | 1/2012 |
| DE | 102010039526 | 2/2012 |
| EP | 0594451 | 4/1994 |
| EP | 0633170 | 1/1995 |
| EP | 0665143 A1 | 8/1995 |
| EP | 0683703 | 11/1995 |
| EP | 0695246 | 2/1996 |
| EP | 0749378 | 12/1996 |
| EP | 0757636 | 2/1997 |
| EP | 0760761 | 3/1997 |
| EP | 0777594 | 6/1997 |
| EP | 0792704 | 9/1997 |
| EP | 0810936 | 12/1997 |
| EP | 0828638 | 3/1998 |
| EP | 0841229 | 5/1998 |
| EP | 0847346 | 6/1998 |
| EP | 0847347 | 6/1998 |
| EP | 0853561 | 7/1998 |
| EP | 0853563 | 7/1998 |
| EP | 0853565 | 7/1998 |
| EP | 0885791 A1 | 12/1998 |
| EP | 0914269 | 5/1999 |
| EP | 0926028 | 6/1999 |
| EP | 0930991 | 7/1999 |
| EP | 0935546 | 8/1999 |
| EP | 0943511 | 9/1999 |
| EP | 1022202 | 7/2000 |
| EP | 1037778 | 9/2000 |
| EP | 0783998 | 10/2000 |
| EP | 1056628 | 12/2000 |
| EP | 1098795 | 5/2001 |
| EP | 1098796 | 5/2001 |
| EP | 1109706 | 6/2001 |
| EP | 1119475 | 8/2001 |
| EP | 1119476 | 8/2001 |
| EP | 1178907 | 2/2002 |
| EP | 1197406 | 4/2002 |
| EP | 1243489 | 9/2002 |
| EP | 1247707 | 10/2002 |
| EP | 1257445 | 11/2002 |
| EP | 1289804 | 3/2003 |
| EP | 1289806 | 3/2003 |
| EP | 1294596 | 3/2003 |
| EP | 1337420 | 8/2003 |
| EP | 1412235 | 4/2004 |
| EP | 1017514 | 6/2004 |
| EP | 1425204 | 6/2004 |
| EP | 1436179 A1 | 7/2004 |
| EP | 1448414 | 8/2004 |
| EP | 1462327 | 9/2004 |
| EP | 1485279 | 12/2004 |
| EP | 1494901 | 1/2005 |
| EP | 1494902 | 1/2005 |
| EP | 1501710 | 2/2005 |
| EP | 1519862 | 4/2005 |
| EP | 1547883 | 6/2005 |
| EP | 1612113 | 1/2006 |
| EP | 1312522 | 4/2006 |
| EP | 1666319 | 6/2006 |
| EP | 1708911 A1 | 10/2006 |
| EP | 1719673 | 11/2006 |
| EP | 1733939 | 12/2006 |
| EP | 1740424 | 1/2007 |
| EP | 1744940 | 1/2007 |
| EP | 1753646 | 2/2007 |
| EP | 1758772 | 3/2007 |
| EP | 1769987 | 4/2007 |
| EP | 1792794 | 6/2007 |
| EP | 1799518 | 6/2007 |
| EP | 1800977 | 6/2007 |
| EP | 1800978 | 6/2007 |
| EP | 1833700 A1 | 9/2007 |
| EP | 1846274 | 10/2007 |
| EP | 1849666 A1 | 10/2007 |
| EP | 1937524 A1 | 7/2008 |
| EP | 2015971 | 1/2009 |
| EP | 2050638 | 4/2009 |
| EP | 2079617 | 7/2009 |
| EP | 2109557 | 10/2009 |
| EP | 2113432 | 11/2009 |
| EP | 2127969 | 12/2009 |
| EP | 2134576 | 12/2009 |
| EP | 2138363 A1 | 12/2009 |
| EP | 2143603 | 1/2010 |
| EP | 2146877 | 1/2010 |
| EP | 2177406 A2 | 4/2010 |
| EP | 2230140 | 9/2010 |
| EP | 2236364 A1 | 10/2010 |
| EP | 2236366 | 10/2010 |
| EP | 2253520 | 11/2010 |
| EP | 2258592 | 12/2010 |
| EP | 1559623 | 1/2011 |
| EP | 2300283 A1 | 3/2011 |
| EP | 2321160 | 5/2011 |
| EP | 2338747 | 6/2011 |
| EP | 2426017 | 3/2012 |
| EP | 002088146-0001 A1 | 8/2012 |
| EP | 002088146-0002 A1 | 8/2012 |
| EP | 2532558 A2 | 12/2012 |
| EP | 2551157 A1 | 1/2013 |
| EP | 2560847 A1 | 2/2013 |
| EP | 2571733 A1 | 3/2013 |
| EP | 2578458 A1 | 4/2013 |
| EP | 2421729 B1 | 3/2014 |
| EP | 2817183 A1 | 12/2014 |
| EP | 2817184 A1 | 12/2014 |
| EP | 002674887-0001 A1 | 2/2015 |
| EP | 2969671 A1 | 1/2016 |
| FR | 2437959 A1 | 4/1980 |
| FR | 2736025 A1 | 1/1997 |

(56) References Cited

FOREIGN PATENT DOCUMENTS

| | | |
|---|---|---|
| FR | 2738201 A1 | 3/1997 |
| FR | 2747976 | 10/1997 |
| FR | 2804392 A1 | 8/2001 |
| FR | 2879987 | 6/2006 |
| FR | 2957877 | 9/2011 |
| GB | 1395918 | 5/1975 |
| GB | 1405579 | 9/1975 |
| GB | 2188672 | 10/1987 |
| GB | 2220844 A | 1/1990 |
| GB | 2324237 | 10/1998 |
| GB | 2348118 A | 9/2000 |
| HK | 1110560 A1 | 5/2010 |
| HK | 1105928 A1 | 8/2010 |
| HK | 1108573 A1 | 10/2011 |
| HK | 1110561 A1 | 7/2012 |
| JP | 0374242 A | 3/1991 |
| JP | 3572527 B2 | 10/2004 |
| JP | 2008037388 A | 2/2008 |
| KR | 10-0891195 B1 | 4/2009 |
| KR | 20120029616 A | 3/2012 |
| MX | 169141 | 6/1993 |
| MX | 9708272 | 8/1998 |
| MX | 9708273 | 8/1998 |
| MX | PA03010189 | 3/2004 |
| MX | PA03010190 | 3/2004 |
| MX | PA05002760 | 6/2005 |
| MX | PA05002988 | 6/2005 |
| MX | PA05008266 | 9/2005 |
| MX | PA05005581 | 11/2005 |
| MX | PA06008594 A | 8/2006 |
| MX | 2007007828 | 7/2007 |
| MX | 2007007829 | 7/2007 |
| MX | 2008012325 | 10/2008 |
| MX | 2008013480 | 10/2008 |
| MX | 2008013814 | 12/2008 |
| MX | 2008014163 | 2/2009 |
| MX | 2009013050 | 1/2010 |
| MX | 2009013051 | 1/2010 |
| MX | 2010009333 | 10/2010 |
| MX | 2011000597 | 3/2011 |
| MX | 2011000598 | 3/2011 |
| MX | 2011003242 | 4/2011 |
| MX | 2011003243 | 4/2011 |
| MX | 2011003911 | 9/2011 |
| MX | 2012002314 A | 6/2012 |
| MX | 2013002710 A | 5/2013 |
| MX | 2013006881 A | 7/2013 |
| MX | 2014001106 A | 3/2014 |
| MX | 2013011449 A | 6/2014 |
| MX | 2013006260 A | 7/2014 |
| MX | 2014001162 A | 7/2014 |
| MX | 2014001161 A | 11/2014 |
| MX | 2014010123 A | 11/2014 |
| MX | 2014010122 A | 5/2015 |
| MX | 2015013210 A | 12/2015 |
| MY | 122308 A | 4/2006 |
| MY | 122563 A | 4/2006 |
| MY | 128028 A | 1/2007 |
| MY | 128970 A | 3/2007 |
| PT | 1800978 | 5/2011 |
| PT | 1800978 E | 5/2011 |
| PT | 1800977 E | 1/2012 |
| RU | 2238198 | 10/2004 |
| RU | 2251500 | 5/2005 |
| RU | 2260527 | 9/2005 |
| RU | 2260528 | 9/2005 |
| RU | 2268176 | 1/2006 |
| RU | 2271287 | 3/2006 |
| RU | 2293034 | 2/2007 |
| RU | 2294291 | 2/2007 |
| RU | 2007127898 | 1/2009 |
| RU | 80415 | 2/2009 |
| RU | 2346834 | 2/2009 |
| RU | 2369500 | 10/2009 |
| RU | 2381120 | 2/2010 |
| RU | 2394706 | 7/2010 |
| RU | 2416536 C1 | 4/2011 |
| RU | 105237 | 6/2011 |
| RU | 108350 | 9/2011 |
| RU | 108741 | 9/2011 |
| RU | 2456180 C2 | 7/2012 |
| RU | 2493033 C2 | 9/2013 |
| RU | 2526773 C2 | 8/2014 |
| RU | 2543448 C2 | 2/2015 |
| RU | 2560217 C2 | 8/2015 |
| RU | 2560954 C2 | 8/2015 |
| RU | 2561173 C2 | 8/2015 |
| RU | 2577830 C1 | 3/2016 |
| RU | 2577981 C1 | 3/2016 |
| RU | 2578001 C2 | 3/2016 |
| RU | 2015144362 A | 4/2017 |
| TW | M404153 U | 5/2011 |
| TW | 201325952 A | 7/2013 |
| TW | 201325953 A | 7/2013 |
| WO | WO 81/03308 | 11/1981 |
| WO | WO 91/06451 | 5/1991 |
| WO | WO 92/06869 | 4/1992 |
| WO | WO 97/12787 | 4/1997 |
| WO | WO 98/01328 | 1/1998 |
| WO | WO 98/01329 | 1/1998 |
| WO | WO 98/50261 | 11/1998 |
| WO | WO 98/51203 | 11/1998 |
| WO | WO 98/51550 | 11/1998 |
| WO | WO 99/08818 | 2/1999 |
| WO | WO 99/15382 | 4/1999 |
| WO | WO 99/56992 | 11/1999 |
| WO | WO 00/05111 | 2/2000 |
| WO | WO 00/06431 | 2/2000 |
| WO | WO 00/21808 | 4/2000 |
| WO | WO 00/21809 | 4/2000 |
| WO | WO 00/21811 | 4/2000 |
| WO | WO 00/38963 | 7/2000 |
| WO | WO 00/38964 | 7/2000 |
| WO | WO 00/53470 | 9/2000 |
| WO | WO 0061409 | 10/2000 |
| WO | WO 01/26942 | 4/2001 |
| WO | WO 01/30618 | 5/2001 |
| WO | WO 01/40034 | 6/2001 |
| WO | WO 01/49537 | 7/2001 |
| WO | WO 01/58732 | 8/2001 |
| WO | WO 01/62559 | 8/2001 |
| WO | WO 01/89890 | 11/2001 |
| WO | WO 01/89891 | 11/2001 |
| WO | WO 01/89892 | 11/2001 |
| WO | WO 01/94166 | 12/2001 |
| WO | WO 02/04168 | 1/2002 |
| WO | WO 02/04266 | 1/2002 |
| WO | WO 02/04267 | 1/2002 |
| WO | WO 02/04268 | 1/2002 |
| WO | WO 02/34590 | 5/2002 |
| WO | WO 02/34596 | 5/2002 |
| WO | WO 02/34597 | 5/2002 |
| WO | WO 02/40328 | 5/2002 |
| WO | WO 02/40329 | 5/2002 |
| WO | WO 02/051677 | 7/2002 |
| WO | WO 02/052917 | 7/2002 |
| WO | WO 02/066301 | 8/2002 |
| WO | WO 02/090155 | 11/2002 |
| WO | WO 02/090156 | 11/2002 |
| WO | WO 03/026938 | 4/2003 |
| WO | WO 03/033316 | 4/2003 |
| WO | WO 03/042017 | 5/2003 |
| WO | WO 03/045746 | 6/2003 |
| WO | WO 03/091078 | 11/2003 |
| WO | WO 03/101794 | 12/2003 |
| WO | WO 03/106233 | 12/2003 |
| WO | WO 2004/002790 | 1/2004 |
| WO | WO 2004/045927 | 6/2004 |
| WO | WO 2004/045928 | 6/2004 |
| WO | WO 2004/048163 | 6/2004 |
| WO | WO 2004/056625 | 7/2004 |
| WO | WO 2004/069617 | 8/2004 |
| WO | WO 2004/076251 | 9/2004 |
| WO | WO 2004/098962 | 11/2004 |

(56) References Cited

FOREIGN PATENT DOCUMENTS

| | | |
|---|---|---|
| WO | WO 2004/098963 | 11/2004 |
| WO | WO 2004/110833 | 12/2004 |
| WO | WO 2005/025956 | 3/2005 |
| WO | WO 2005/039944 | 5/2005 |
| WO | WO 2008/051483 | 5/2005 |
| WO | WO 2005/054017 | 6/2005 |
| WO | WO 2005/080160 | 9/2005 |
| WO | WO 2005/082691 | 9/2005 |
| WO | WO 2005/087560 | 9/2005 |
| WO | WO 2005/092680 | 10/2005 |
| WO | WO 2005/102801 | 11/2005 |
| WO | WO 2005/115813 | 12/2005 |
| WO | WO 2005/123471 | 12/2005 |
| WO | WO 2006/000393 | 1/2006 |
| WO | WO 2006/013152 | 2/2006 |
| WO | WO 2006/040259 | 4/2006 |
| WO | WO 2006/048355 | 5/2006 |
| WO | WO 2006/061284 | 6/2006 |
| WO | WO 2006/069648 | 7/2006 |
| WO | WO 2006/074995 | 7/2006 |
| WO | WO 2006/079591 | 8/2006 |
| WO | WO 2006/081893 | 8/2006 |
| WO | WO 2006/106006 | 10/2006 |
| WO | WO 2006/106109 | 10/2006 |
| WO | 2006119679 A1 | 11/2006 |
| WO | WO 2006/114355 | 11/2006 |
| WO | WO 2006/117081 | 11/2006 |
| WO | WO 2006/117085 | 11/2006 |
| WO | WO 2006/117308 | 11/2006 |
| WO | WO 2007/009885 | 1/2007 |
| WO | WO 2007/014389 | 2/2007 |
| WO | WO 2007/014395 | 2/2007 |
| WO | WO 2007/035288 | 3/2007 |
| WO | WO 2007/042377 | 4/2007 |
| WO | WO 2007/045549 | 4/2007 |
| WO | WO 2007/071487 | 6/2007 |
| WO | WO 2007/073974 | 7/2007 |
| WO | WO 2007/102404 | 9/2007 |
| WO | WO 2007/122095 | 11/2007 |
| WO | WO 2007/128677 | 11/2007 |
| WO | WO 2008/003633 | 1/2008 |
| WO | WO 2008/043622 | 4/2008 |
| WO | WO 2008/076402 | 6/2008 |
| WO | WO 2008/122453 | 10/2008 |
| WO | WO 2008/124113 | 10/2008 |
| WO | WO 2008/135308 | 11/2008 |
| WO | WO 2009/000498 | 12/2008 |
| WO | WO 2009/115494 | 9/2009 |
| WO | WO 2009/121849 | 10/2009 |
| WO | WO 2009/124792 | 10/2009 |
| WO | WO 2009/132982 | 11/2009 |
| WO | WO 2009/153097 | 12/2009 |
| WO | WO 2009/155230 | 12/2009 |
| WO | WO 2010/016000 | 2/2010 |
| WO | 2010033646 A2 | 3/2010 |
| WO | WO 2010/028866 | 3/2010 |
| WO | WO 2010/028918 | 3/2010 |
| WO | WO 2010/034445 | 4/2010 |
| WO | WO 2010/034447 | 4/2010 |
| WO | WO 2010/035794 | 4/2010 |
| WO | WO 2010/091757 | 8/2010 |
| WO | WO 2010/098877 | 9/2010 |
| WO | WO 2010/112579 | 10/2010 |
| WO | WO 2010/121665 | 10/2010 |
| WO | 2010127888 A1 | 11/2010 |
| WO | WO 2011/032753 | 3/2011 |
| WO | WO 2011/032760 | 3/2011 |
| WO | WO 2011/040743 | 4/2011 |
| WO | WO 2011/060979 | 5/2011 |
| WO | WO 2011/116995 | 9/2011 |
| WO | WO 2011/120723 | 10/2011 |
| WO | WO 2011/124404 | 10/2011 |
| WO | WO 2011/131395 | 10/2011 |
| WO | WO 2011/144400 | 11/2011 |
| WO | WO 2011/157465 | 12/2011 |
| WO | WO2012/001175 | 1/2012 |
| WO | WO2012/014054 | 2/2012 |
| WO | WO 2012/033363 | 3/2012 |
| WO | 2013/016493 A1 | 1/2013 |
| WO | 2013/019645 A1 | 2/2013 |
| WO | 2013/019723 A1 | 2/2013 |
| WO | 2013089312 A1 | 6/2013 |
| WO | 2013/126907 A1 | 8/2013 |
| WO | 2013/126910 A1 | 8/2013 |
| WO | 13176352 A1 | 11/2013 |
| WO | 2014/145538 A1 | 9/2014 |
| WO | 2016/160687 A1 | 10/2016 |
| WO | 2017/075066 A1 | 5/2017 |
| ZA | 200006220 B | 7/2001 |

OTHER PUBLICATIONS

International Search Report dated Sep. 19, 2012 for PCT/US2012/048617 filed Jul. 27, 2012.

International Search Report dated Sep. 19, 2012 for PCT/US2012/048262 filed Jul. 26, 2012.

Non-Final Rejection towards U.S. Appl. No. 13/453,601 dated Jul. 9, 2013.

Non-Final Rejection towards U.S. Appl. No. 13/453,601 dated Jan. 10, 2014.

Final Rejection towards U.S. Appl. 13/453,601 dated Aug. 1, 2014.

Non-Final Rejection towards U.S. Appl. No. 13/453,601 dated Feb. 4, 2015.

Final Rejection towards U.S. Appl. No. 13/453,601 dated Jun. 3, 2015.

Non-Final Rejection towards U.S. Appl. No. 13/453,601 dated Jan. 8, 2016.

Notice of Allowance towards U.S. Appl. No. 13/453,601 dated May 20, 2016.

Non-Final Rejection towards U.S. Appl. No. 13/558,624 dated May 16, 2014.

Final Rejection towards U.S. Appl. No. 13/558,624 dated Sep. 29, 2014.

Non-Final Rejection towards U.S. Appl. No. 13/558,624 dated Mar. 6, 2015.

Notice of Allowance towards U.S. Appl. No. 13/558,624 dated Jun. 29, 2015.

Non-Final Rejection towards U.S. Appl. No. 13/560,585 dated Jul. 29, 2014.

Final Rejection towards U.S. Appl. No. 13/560,585 dated Jan. 28, 2015.

Non-Final Rejection towards U.S. Appl. No. 13/560,585 dated Jun. 24, 2015.

Notice of Allowance towards U.S. Appl. No. 13/560,585 dated Mar. 22, 2016.

Non-Final Rejection towards U.S. Appl. No. 13/679,646 dated Feb. 2, 2015.

Final Rejection towards U.S. Appl. No. 13/679,646 dated Sep. 2, 2015.

Non-Final Rejection towards U.S. Appl. No. 13/679,646 dated Jun. 13, 2016.

Non-Final Rejection towards U.S. Appl. No. 13/679,646 dated Jan. 4, 2017.

Non-Final Rejection towards U.S. Appl. No. 13/572,100 dated Jun. 3, 2014.

Non-Final Rejection towards U.S. Appl. No. 13/587,389 dated Oct. 31, 2014.

Final Rejection towards U.S. Appl. No. 13/587,389 dated Feb. 25, 2015.

Notice of Allowance towards U.S. Appl. No. 13/587,389 dated Jun. 19, 2015.

Non-Final Rejection towards U.S. Appl. No. 14/928,467 dated Apr. 28, 2016.

Final Rejection towards U.S. Appl. No. 14/928,467 dated Sep. 14, 2016.

Non-Final Rejection towards U.S. Appl. No. 13/194,070 dated Apr. 8, 2013.

(56) References Cited

OTHER PUBLICATIONS

Final Rejection towards U.S. Appl. No. 13/194,070 dated Aug. 27, 2013.
Non-Final Rejection towards U.S. Appl. No. 13/194,070 dated Dec. 26, 2013.
Notice of Allowance towards U.S. Appl. No. 13/194,070 dated Apr. 18, 2014.
Non-Final Rejection towards U.S. Appl. No. 14/329,423 dated Sep. 10, 2014.
Notice of Allowance towards U.S. Appl. No. 14/329,423 dated Apr. 15, 2015.
Non-Final Rejection towards U.S. Appl. No. 29/413,428 dated Nov. 7, 2012.
Notice of Allowance towards U.S. Appl. No. 29/413,428 dated Jun. 14, 2013.
Notice of Allowance towards U.S. Appl. No. 29/413,430 dated Nov. 26, 2012.
Non-Final Rejection towards U.S. Appl. No. 29/375,477 dated Sep. 7, 2012.
Notice of Allowance towards U.S. Appl. No. 29/375,477 dated Jan. 15, 2014.
Notice of Allowance towards U.S. Appl. No. 29/429,262 dated Jun. 27, 2013.
Non-Final Rejection towards U.S. Appl. No. 14/035,610 dated Apr. 22, 2016.
Final Rejection towards U.S. Appl. No. 14/035,610 dated Aug. 5, 2016.
Non-Final Rejection towards U.S. Appl. No. 14/035,610 dated Dec. 30, 2016.
Non-Final Rejection towards U.S. Appl. No. 13/776,376 dated Nov. 18, 2014.
Non-Final Rejection towards U.S. Appl. No. 13/840,256 dated Nov. 26, 2014.
Non-Final Rejection towards U.S. Appl. No. 14/715,180 dated Jan. 7, 2016.
Final Rejection towards U.S. Appl. No. 14/715,180 dated Aug. 16, 2016.
Definition of rectangular in Oxford Dictionary 2017.
Non-Final Rejection towards U.S. Appl. No. 14/715,180 dated May 22, 2017.
Non-Final Rejection towards U.S. Appl. No. 14/721,476 dated May 16, 2017.
International Search Report and Written Opinion issued in PCT Application No. PCT/US2013/027684 dated Apr. 29, 2013.
International Search Report and Written Opinion issued in PCT Application No. PCT/US2014/030329 dated Jun. 3, 2014.
First Office Action issued in connection with CA Application No. 2865292 dated Aug. 25, 2015.
Second Office Action issued in connection with CA Application No. 2865292 dated Aug. 15, 2016.
Non-Final Rejection towards U.S. Appl. No. 13/776,383 dated Mar. 10, 2015.
Final Rejection towards U.S. Appl. No. 13/776,383 dated Aug. 14, 2015.
International Search Report and Written Opinion issued in PCT Application No. PCT/US2013/027688 dated Apr. 25, 2013.
First Office Action issued in connection with CA Application No. 2865295 dated Aug. 25, 2015.
Non-Final Rejection towards U.S. Appl. No. 14/216,082 dated Apr. 12, 2017.
Non-Final Rejection towards U.S. Appl. No. 14/200,792 dated Oct. 23, 2015.
Final Rejection towards U.S. Appl. No. 14/200,792 dated Feb. 23, 2016.
Notice of Allowance issued towards U.S. Appl. No. 14/200,792 dated Jul. 22, 2016.
Notice of Allowance issued towards U.S. Appl. No. 29/504,287 dated Sep. 12, 2016.
Non-Final Rejection towards U.S. Appl. No. 29/504,292 dated Jun. 19, 2015.
Final Rejection towards U.S. Appl. No. 29/504,292 dated Jan. 20, 2016.
Advisory Action towards U.S. Appl. No. 29/504,292 dated May 19, 2016.
Notice of Allowance issued towards U.S. Appl. No. 29/504,292 dated Aug. 16, 2016.
International Search Report and Written Opinion issued in PCT Application No. PCT/US2016/024490 dated Jun. 21, 2016.
Notice of Allowance issued towards U.S. Appl. No. 29/525,746 dated Apr. 7, 2016.
Notice of Allowance issued towards U.S. Appl. No. 29/571,419 dated Jan. 31, 2017.
Notice of Allowance issued towards U.S. Appl. No. 29/571,424 dated Feb. 1, 2017.
International Search Report and Written Opinion issued in PCT Application No. PCT/US2016/058887 dated Jan. 3, 2017.

\* cited by examiner

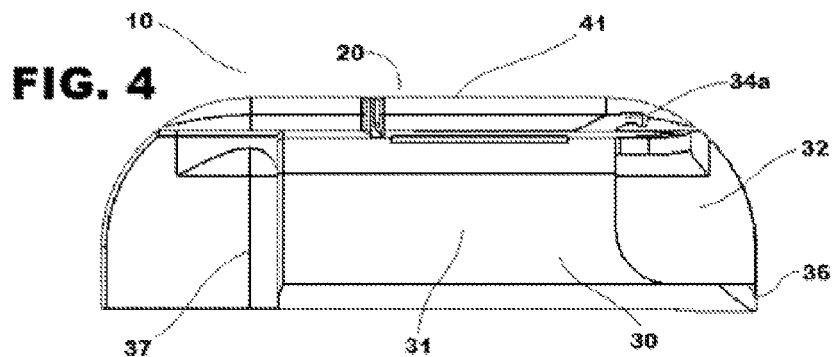
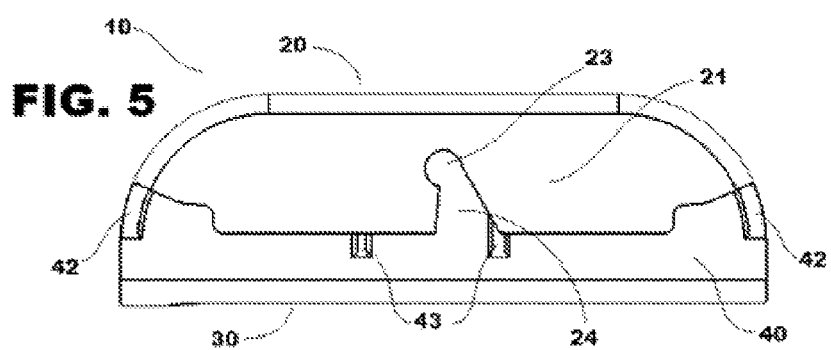
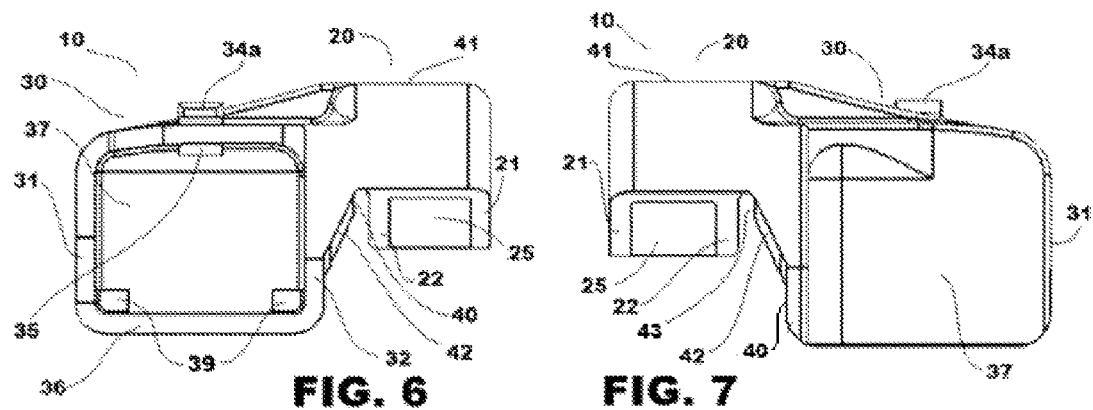

WINDSHIELD WIPER CONNECTOR AND ASSEMBLY

CROSS REFERENCE TO RELATED APPLICATIONS

This application is a continuation of U.S. application Ser. No. 14/200,792 filed on Mar. 7, 2014, the entire contents of which are incorporated herein by reference.

FIELD AND RELATED ART

This invention relates in general to windshield wipers, and more particularly, to an improved connector for a windshield wiper that allows the windshield wiper to be attached to certain windshield wiper arm configurations in side saddle position. The invention is also directed to windshield wipers incorporating these novel connectors.

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with plurality of wiper blade arm configuration.

The need to attach replacement windshield wiper blades to multiple arms has been addressed to some degree. For example, windshield wiper blades have been designed to work with various hook-type wiper arms having different sizes. Connectors may also be configured to receive either a pin-type arm, a hook-type arm and a variety of other arms, such as described in U.S. Pat. No. 6,640,380, which is incorporated herein by reference in its entirety. Although these connectors may increase the usefulness of a given windshield wiper such that it can be used with different wiper arm types, the connectors are often expensive and have complicated structures that are difficult and time-consuming to manufacture.

Whereas many automobiles on the market have arms that attach to a wiper blade directly over the wiper strip hooks that connect inside of, or pin arms where the pin enters into, a mounting base or other connecting device that is above the wiper strip), more recent automobiles contain wiper arms that are designed to attach to the side of a wiper blade. These wiper arms (sometimes referred to herein as "side-saddle wiper arms") are generally provided on vehicles with a specially designed wiper blade that is designed to connect only to that specific type of arm and require special mounting bases or connectors designed to accommodate such an arm, When the wiper blade must be replaced, the replacement must generally be done at a car dealership and requires the purchase of an expensive replacement part. Moreover, there are several versions of these wiper arms, some of which have varying lengths, locking arms or spacers. Accordingly, an aftermarket provider that offers windshield wipers that are not directed to a specific car must evaluate whether to add a separate connector to accommodate each particular side saddle wiper arm. This leaves consumers with vehicles having the new wiper arms with fewer, usually more expensive, alternatives for replacement windshield wipers.

Thus, there is a need for an inexpensive connector that is capable of securing a windshield wiper blade to certain side-saddle wiper arms. In particular, it would be desirable to have a connector that can be attached to a wiper blade and that preferably can be used to connect that wiper blade to certain types of these side-saddle wiper arms. It would also be desirable to have a windshield wiper connector that can be fabricated or molded as a single piece or with few pieces at low-cost that can accommodate these types of side-saddle wiper arms.

SUMMARY

The following presents a simplified summary of the invention in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in a simplified form as a prelude to the more detailed description that is presented later.

The invention is generally directed to novel connectors for windshield wiper blades, including those that accommodate certain types of side-saddle wiper arms. More particularly, the invention relates, in part, to a single-piece (or few-piece) windshield wiper connector that can accommodate wiper arms having top-locking mechanisms. The invention is also directed to wiper blades incorporating the connectors described herein.

In certain embodiments a wiper blade connector may have a mounting portion and a side saddle portion. The mounting portion may have a wiper blade securing element that is capable of securing a wiper blade. The side-saddle portion may have two side walls, a top wall and a bottom surface, defining a receiving cavity therebetween. The top wall of the side saddle portion may further have a cantilever with a locking tab.

In certain embodiments, a wiper blade assembly may include a wiper blade, and a connector having a mounted portion and a side-saddle portion. The mounting portion may have a wiper securing element capable of securing the connector to wiper blade. The side-saddle portion may include two side walls, a top wall and a bottom surface, defining a receiving cavity. The top wall may have a cantilever with a locking tab.

In certain embodiments, a wiper blade connector may have a mounting portion having a wiper securing element capable of securing a wiper blade, and a side-saddle portion capable of securing a wiper arm, having a top wall with a cantilever that has a locking tab.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The following description and the annexed drawings set forth certain illustrative aspects of the invention. These aspects are indicative of but a few of the various ways in which the principles of the invention may be employed and the present invention is intended to include all such aspects and their equivalents. Other advantages and novel features of the invention will become apparent from the following detailed description of the invention when considered in conjunction with the drawings.

FIG. 4 is a side view of the connector depicted in FIG. 2, showing a side-saddle, or second, portion of the connector.

FIG. 5 is a side view of the connector depicted in FIG. 2, showing a mounting, or first, portion of the connector.

FIG. 6 is a front end view of the connector depicted in FIG. 2, showing an end where the wiper arm enters the connector when it is attached.

FIG. 7 is a back end view of the connector depicted in FIG. 2, showing an end opposite the opening where the wiper arm may enters the connector when it is attached.

DETAILED DESCRIPTION

Figure 1:
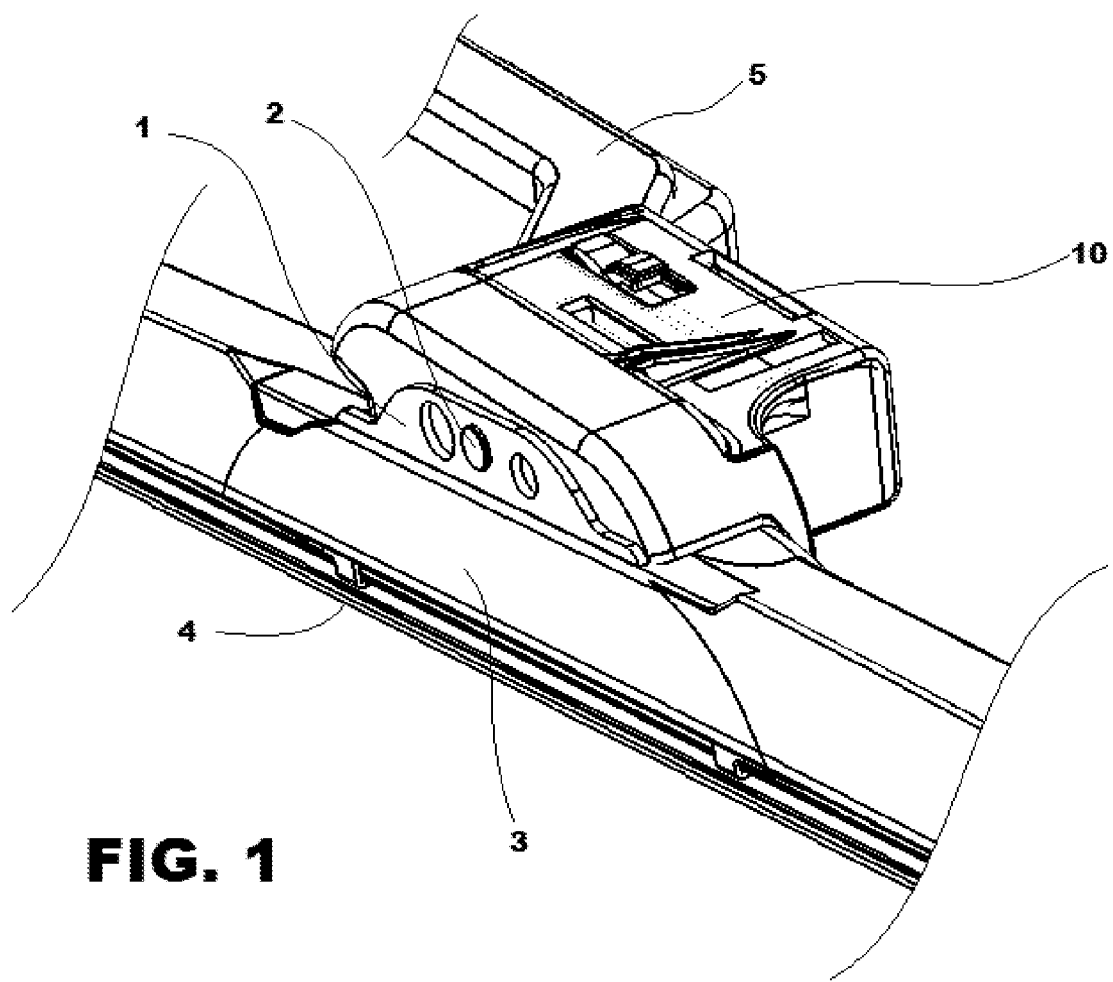
FIG. 1 is a perspective view of an embodiment of the disclosed concept of a connector attached to a wiper blade.

The foregoing summary, as well as the following detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents.

In the description that follows, like numerals or reference designators will be used to refer to like parts or elements throughout. In this document, the terms "a" or "an" are used, as is common in patent documents, to include one or more than one. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In certain embodiments a wiper blade connector may have a mounting portion and a side saddle portion. The mounting portion may have a wiper blade securing element that is capable of securing a wiper blade. The side-saddle portion may have two side walls, a top wall and a bottom surface, defining a receiving cavity therebetween. The top wall of the side saddle portion may further have a cantilever with a locking tab.

In certain embodiments, the wiper securing element may have a rivet clip. In such embodiments, the mounting portion may also have a pair of mounting side walls, such that the rivet clip is embodied on each of the mounting side walls. In other embodiments, the wiper securing element may have a rivet capable of engaging a rivet clip on the wiper blade in order to secure the connector to the wiper blade.

In certain embodiments, the side saddle portion may also have at least one reinforcing member. In certain embodiments the cantilever may have an elevated tab. In certain embodiments, the bottom surface may have a front bar, In certain embodiments, the bottom surface may have a pair of bottom rails.

In certain embodiments, a wiper blade assembly may include a wiper blade, and a connector having a mounted portion and a side-saddle portion. The mounting portion may have a wiper securing element capable of securing the connector to wiper blade. The side-saddle portion may include two side walls, a top wall and a bottom surface, defining a receiving cavity. The top wall may have a cantilever with a locking tab.

In certain such embodiments, the wiper securing element may have a rivet clip. In such embodiments, the mounting portion further may comprise a pair of mounting side walls, and wherein the rivet clip is embodied on each of the mounting side walls. In other such embodiments, the wiper securing element may have a rivet capable of engaging a rivet clip the wiper blade in order to secure the connector to the wiper blade.

In certain embodiments, the side saddle portion further may have at least one reinforcing member. In certain embodiments the cantilever may also have an elevated tab. In certain such embodiments, the top wall may have a depression in the vicinity of the elevated tab. In certain embodiments the bottom surface may have a front bar. In certain embodiments, the bottom surface comprises a pair of bottom rails.

In certain embodiments, a wiper blade connector may have a mounting portion having a wiper securing element capable of securing a wiper blade, and a side-saddle portion capable of securing a wiper arm, having a top wall with a cantilever that has a locking tab.

In certain embodiments the wiper securing element comprises a rivet clip. In certain such embodiments, the mounting portion further comprises a pair of mounting side walls, and wherein the rivet clip is embodied on each of the mounting side walls.

Figure 18:
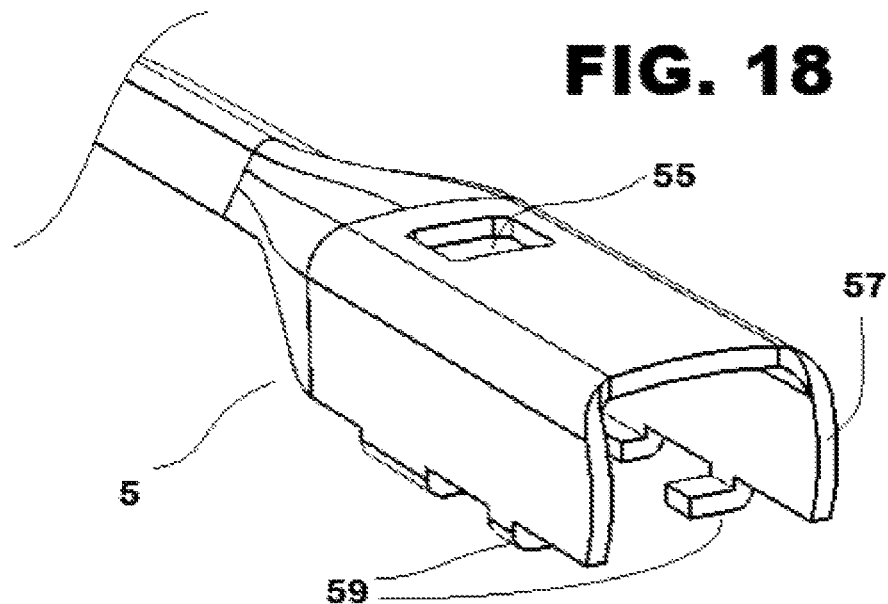
FIG. 18 is a perspective view from above of one type of wiper arm that can connect to the embodiments of the disclosed concepts depicted in FIGS. 1-17.
Figure 19:
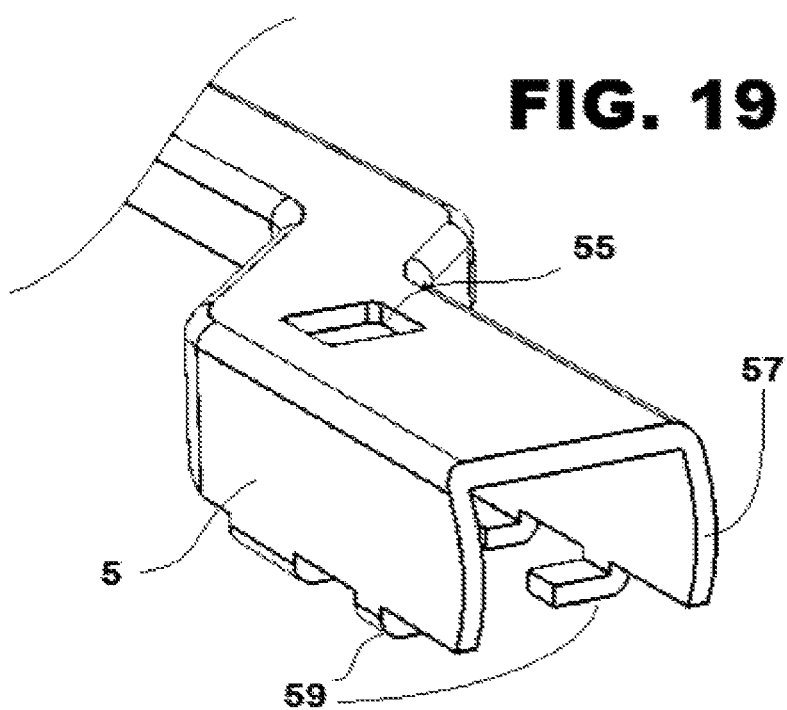
FIG. 19 is a perspective view from above of another type of wiper arm that can connect to the embodiments of the disclosed concepts depicted in FIGS. 1-17.

FIG. 1 is a perspective view of an embodiment of the connector 10 attached to a wiper blade having a mounting base 1 with a rivet 2, a cover 3 for the base of the mounting base 1, and a wiper strip 4. The connector 10 as shown is attached to the rivet 2 of mounting base 1 of the wiper blade. A wiper arm 5 is shown connected to the connector 10. Examples of the types of wiper arms that can be engaged are shown in FIGS. 18 and 19.

Figure 2:
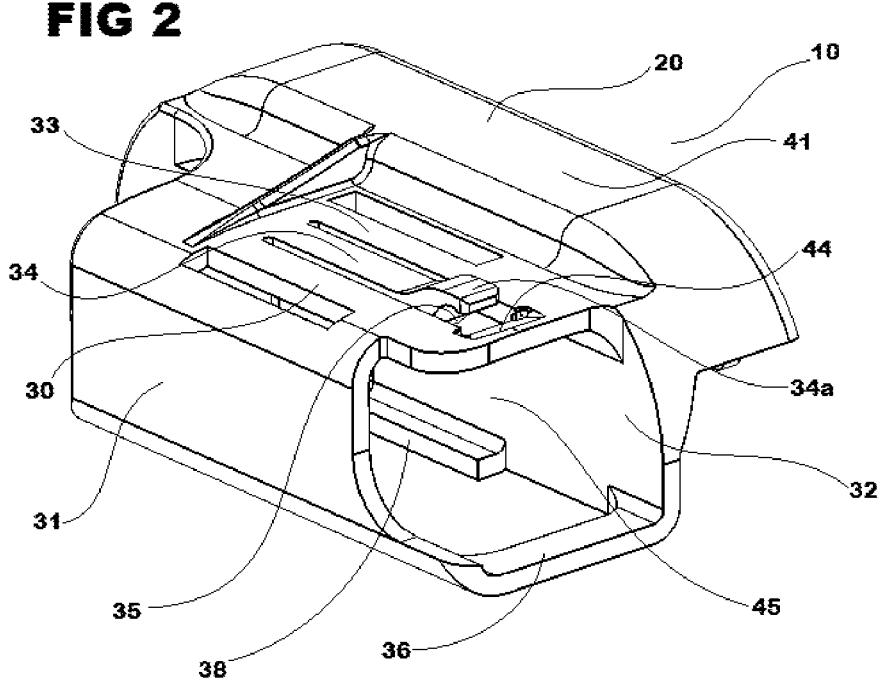
FIG. 2 is a perspective view of an embodiment of the disclosed concept of a connector viewed from above.
Figure 3:
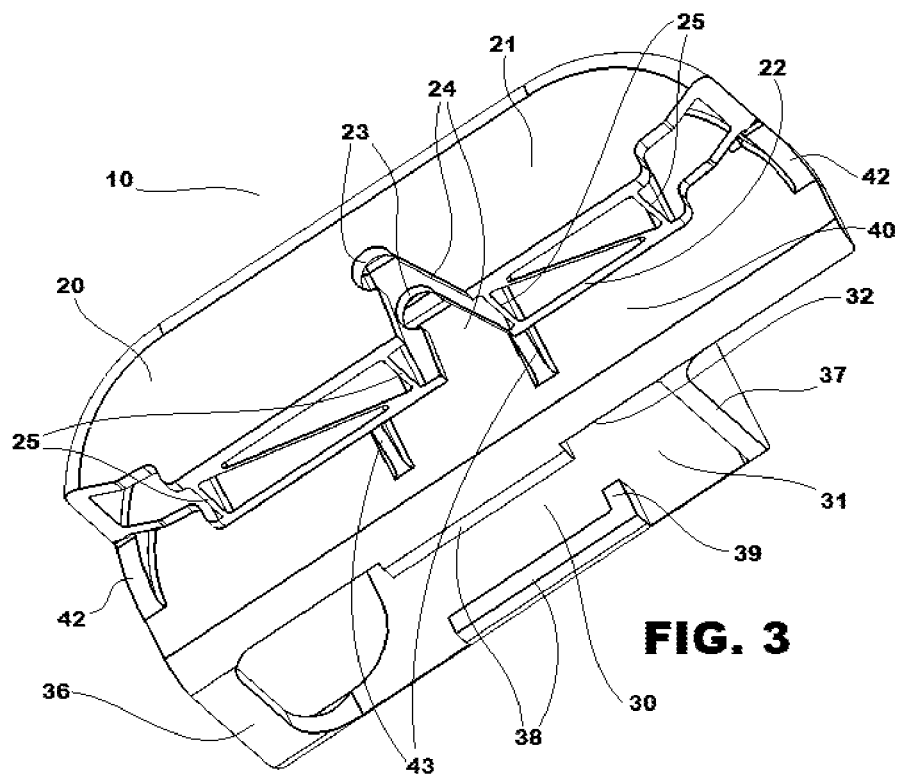
FIG. 3 is a perspective view of the connector depicted in FIG. 2, viewed from below.

FIGS. 2-9 provide various views of an embodiment of a connector 10 of the present invention, FIGS. 2 and 3 are perspective views of connector 10 from above and below, respectively. FIG. 2 shows certain structures that may be present in the side-saddle, or second, portion 30 of the connector 10. FIG. 3 shows certain structures present in the mounting, or first, portion 20 of the connector 10, as well some features on the bottom of the side saddle portion 30.

The side-saddle, or second, portion 30 of the connector 10 is configured to receive a. wiper arm 5. Generally speaking, the side-saddle portion 30 includes a receiving cavity 45, in which a wiper arm 5 can be secured. The receiving cavity may be defined by two spaced-apart side walls 31, 32, a top wall 33, and a bottom surface which may include a front bar 36 and bottom rails 38. The bottom surface may be contiguous or, as shown in FIGS. 2-9, may be made up from separate elements. The side-saddle portion 30 may also have an end wall 37. The end wall 37, if present, may serve to provide additional structural support for the side-saddle side walls 31, 32.

In certain embodiments, such as the example embodiment in FIGS. 2-9, the wiper arm may be secured to the connector by a locking projection 35 located on a cantilever beam 34. When the wiper arm is secured to the connector the locking projection 35 may engage a locking recess or hole 55 on the wiper arm (shown for instance in FIGS. 18 and 19). The front of the locking projection 35 may be chamfered to allow the wiper arm to push the locking tab 35 up as the wiper arm 5 is inserted into the receiving cavity 45. Alternatively, the locking tab 35 may be lifted to allow the wiper arm 5 to enter the receiving cavity, and lowered into the locking recess or hole 55 once the wiper arm 5 has been inserted. The cantilever 34 may include an elevated tab 34*a* to facilitate lifting of the cantilever 34 to disengage the locking projection 35 from the locking recess or hole 55 in the wiper arm 5. To further facilitate manipulation of the cantilever 34, the top wall 33 of the side saddle portion 30 may be provided with a depression 44 in the vicinity of the elevated tab 34*a*.

As shown in FIG. 3, in certain embodiments the bottom rails 36 of the side saddle portion 30, may be provided with stops 39. The stops may be positioned to accommodate a particular length of wiper arm 5, and may act to limit the distance that the wiper arm 5 can enter the receiving cavity 45 by engaging bottom claws 59 on the wiper arm 5. In other embodiments the end wall 37 may act as a stop, engaging the front end 57 of the wiper arm 5 (illustrated for instance in FIGS. 18 and 19), and setting the limit to which the wiper arm 5, may enter the receiving cavity 45 of the connector 10.

Generally speaking, the connector 10 may have various shapes and sizes depending upon the application in question. In certain embodiments, the connector is configured to accommodate the shape of the wiper blade, including the shape of the wiper blade's mounting base 1, cover 2, or both. In certain embodiments, the connector 10 may have a contoured edge 42.

As shown in FIG. 3, the mounting, or second, portion 20 of the connector 10 is configured to connect the connector to a wiper blade, and has a wiper securing element which secures the connector to a wiper blade. As shown in the exemplary embodiment in FIG. 3, the mounting portion 20 may have spaced apart mounting side walls 21, 22, and the wiper securing element may be a rivet clip 23 in each of the mounting side walls 21, 22. In this embodiment, connection is made to a wiper blade via the rivet 2 of a wiper blade being positioned in the rivet passages 24 of the mounting side walls 21, 22 of the mounting portion 20 of the connector 10. The connector 10 may be pushed down onto the wiper such that the rivet 2 passes through the rivet passages 24 and into the rivet clip 23.

Other methods for connecting a connector 10 to a wiper blade known in the art are contemplated within the scope of the present invention, including having pin passages and pin clips which connect to one or more pins in the wiper blade; having one or more detents in the connector 10 which engage shoulders in apertures or recesses in the wiper blade; having recesses in the peripheral wall of the connector that can accept and secure a rivet or pin; having deflectable or rigid pins or detents in the connector 10, which engage corresponding recesses, apertures or shoulders in the wiper blade; and other form-fitting or friction fitting connections and the like.

The mounting portion 20 of the connector 10 may also have reinforcing walls 25 extending between the mounting side walk 21, 22 for purposes of structural rigidity, reinforcement, or other purposes. Diagonal reinforcing walls may be added for further structural support and rigidity. Reinforcing ribs 43, or other features may also be used to reinforce the mounting side walls 21, 22.

The connector 10 may optionally feature one or more interim walls 40 between the mounting portion 20 and the side-saddle portion 30. The interim walk may feature reinforcing ribs 43 that can be used to provide structural support to the inner side-saddle side wall 32. Additionally, the interim wall 40 may be joined to the inner mounting side wall 22 to provide additional structural support. Other reinforcing features may be used to further provide structural support.

FIG. 4 shows a side view of an example embodiment of connector 10, showing side-saddle side walls 31, 32, the front bar 36, and end wall 37, the elevated tab 34*a* is also shown.

FIG. 5 shows a side view of the exemplary embodiment of connector 10 showing the outer mounting wall 21, having a rivet clip 23 and a rivet passage 24. Through the rivet clip 23, the interim wall 40 can be seen, together with the reinforcing ribs 43. The contour edges 42 which may be adapted to the shape of the wiper blade are also shown.

FIG. 6 shows a front end view of the exemplary embodiment of connector 10, on the side where the wiper arm 5 may enter the connector. The end wall 37 and side walls 31, 32, top wall 33, front bar 36, elevated tab 34*a*, locking tab 35 and stops 39 of the side-saddle portion 30 are shown. The contoured edge 42 and interim wall 40, are also shown. The mounting portion 20, with its mounting sidewalls 21, 22 and reinforcing wall 25 are also shown.

FIG. 7 shows the back end view of the exemplary embodiment of connector 10 opposite the entrance to the receiving cavity 45 of connector 10. The features shown are similar to those depicted in FIG. 6, except that FIG. 7 shows that the end wall 37, which obscures the front and internal features of the side saddle portion 30.

Figure 8:
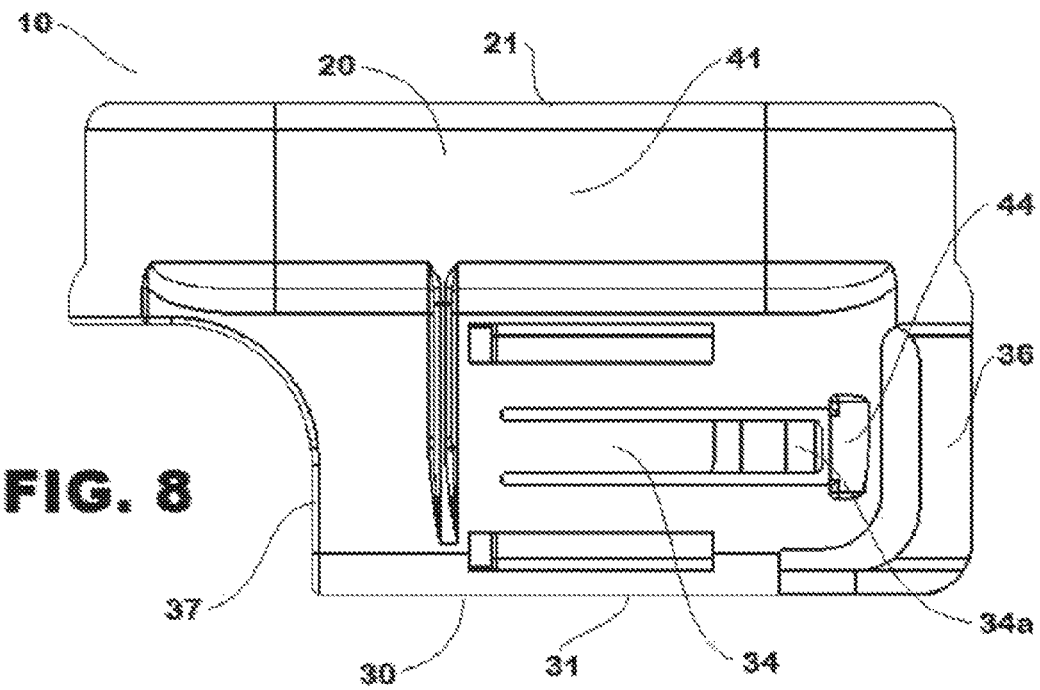
FIG. 8 is a top view of the connector depicted in FIG. 2.

FIG. 8 shows a top view of the exemplary embodiment of connector 10, showing side saddle portion 30 and its cantilever 34, elevated tab 34a, depression 44, side-saddle side walls 31, 32, top wall 33, end wall 37, and front bar 36. Also shown are the top surface 41 over the mounting portion 20, and the outer mounting wall 21.

Figure 9:
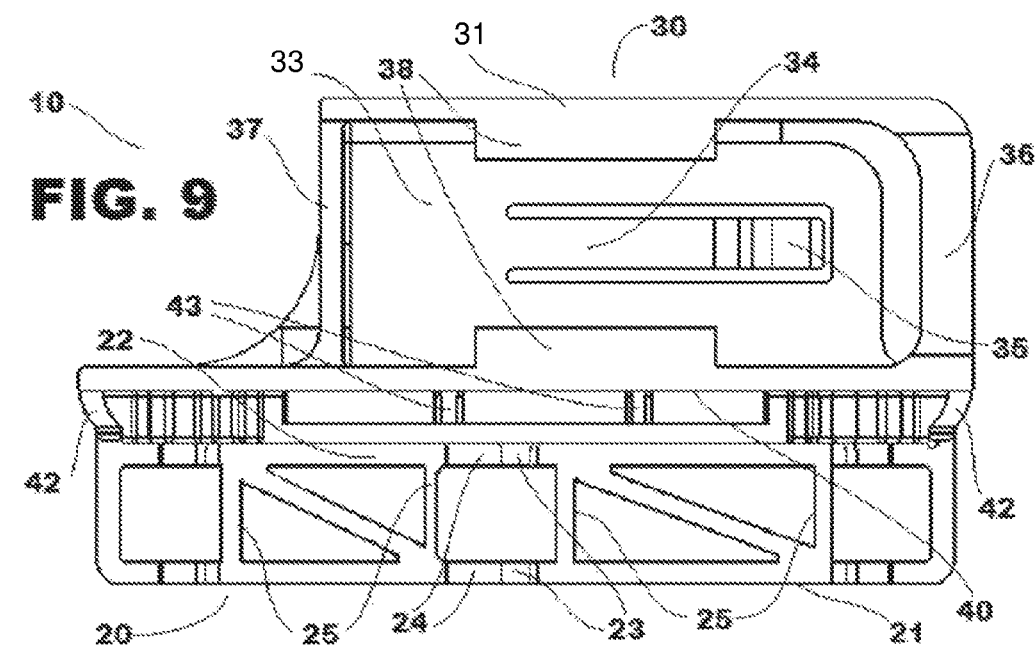
FIG. 9 is a bottom view of the connector depicted in FIG. 2.

FIG. 9 shows a bottom view of the exemplary embodiment of connector 10, which shows the side-saddle side walls 31, 32, top wall 33 (from underneath), end walls 37, front bar 36 and bottom rails 38 of the side-saddle portion 30. Also shown are mounting side walls 21, 22, reinforcing walls 25, rivet clips 23, and rivet passages 24 of mounting portion 20. This embodiment features an interim wall 40 having reinforcing ribs 43, that is combined with the inner side saddle wall 32.

FIGS. 10-17 show additional embodiment of a connector 10 contemplated within this disclosure.

Figure 10:
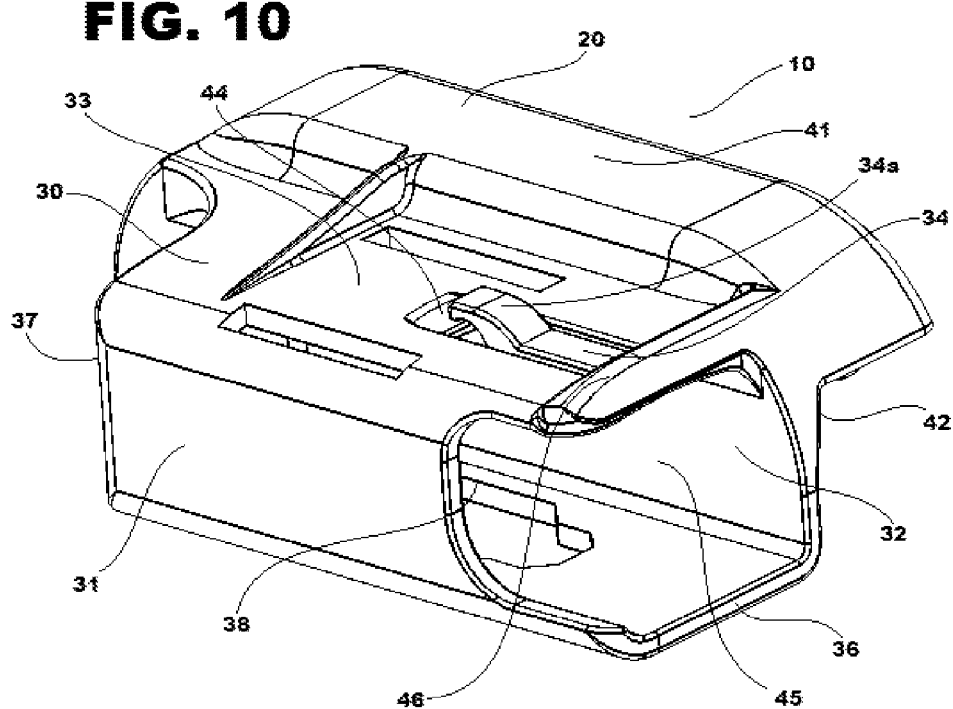
FIG. 10 is a perspective view of another embodiment of the disclosed concept of a connector viewed from above.
Figure 16:
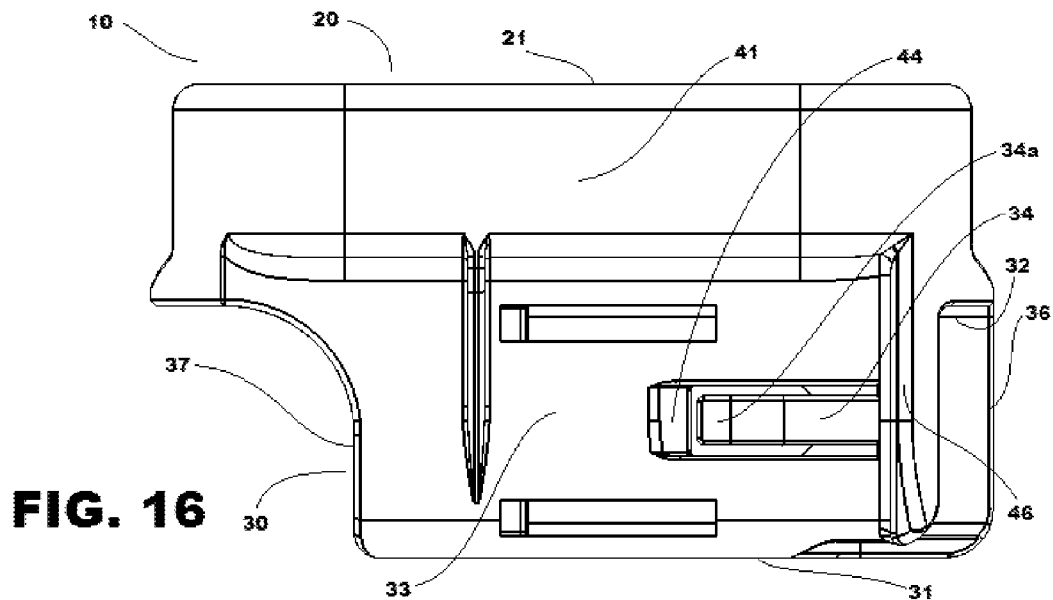
FIG. 16 is a top view of the connector depicted in FIG. 10.
Figure 17:
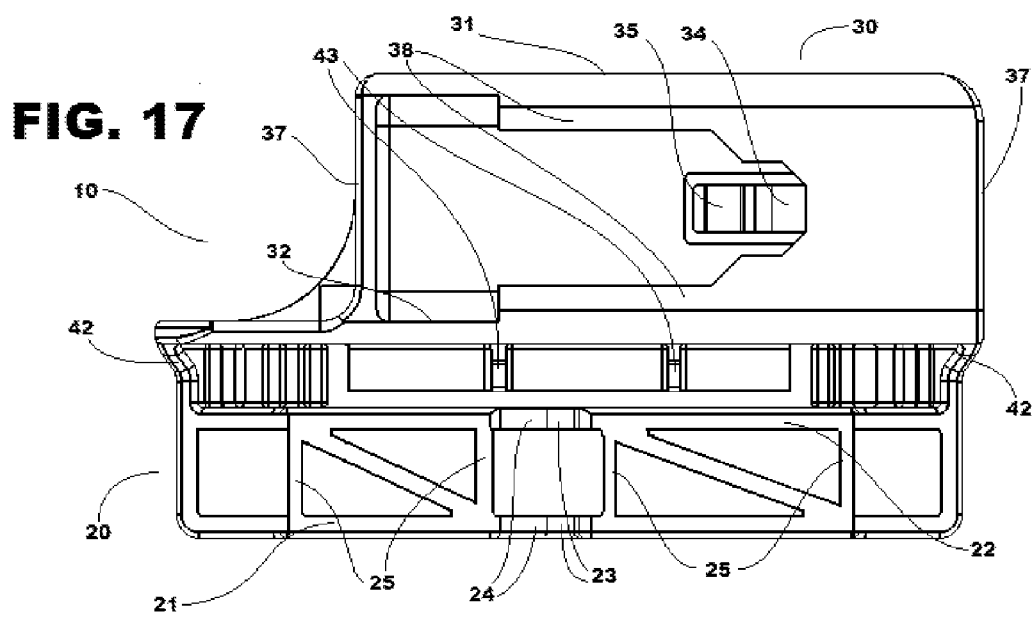
FIG. 17 is a bottom view of the connector depicted in FIG. 10.

As shown in FIGS. 10, 16 and 17, the cantilever 34 may be oriented from front to back, extending from an area in the vicinity of the front end of the top wall 33 towards the end wall 37 of the connector 10. A cantilever so oriented may still have an elevated tab 34a and a locking tab 35, which may be chamfered to facilitate the insertion of a wipe arm. This may allow for a shorter and sturdier cantilever 34 that has a more natural motion as the wiper arm enters the cavity 45.

FIGS. 10, 12, 14, 15 and 16 also depict a horizontal reinforcing member 46 added to the front end of the top wall 33 in order to give it increased structural support. Other types of reinforcing members 46 may be added to the walls of the connector in horizontal, vertical or transverse orientations to give the connector additional structural support. Reinforcing members 46 may be added to the outer surfaces (21, 31, 33, 41) or to the interior surfaces (21, 22, 31, 32, 33, 36, 40) of the connector 10 as desired.

Figure 11:
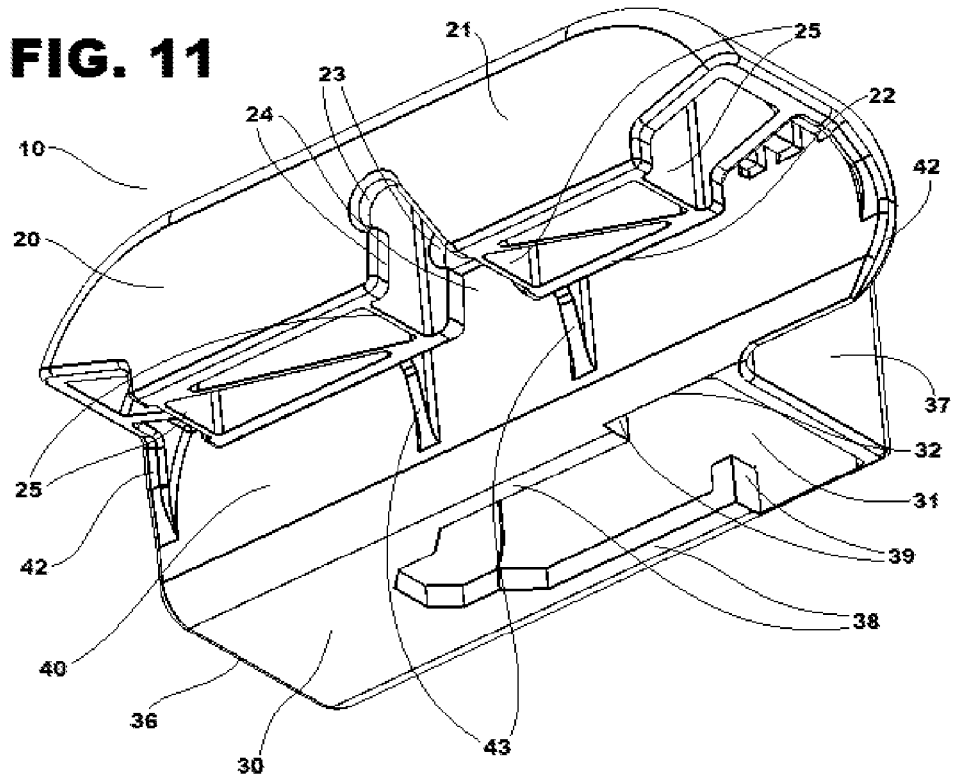
FIG. 11 is a perspective view of the connector depicted in FIG. 10, viewed from below.
Figure 12:
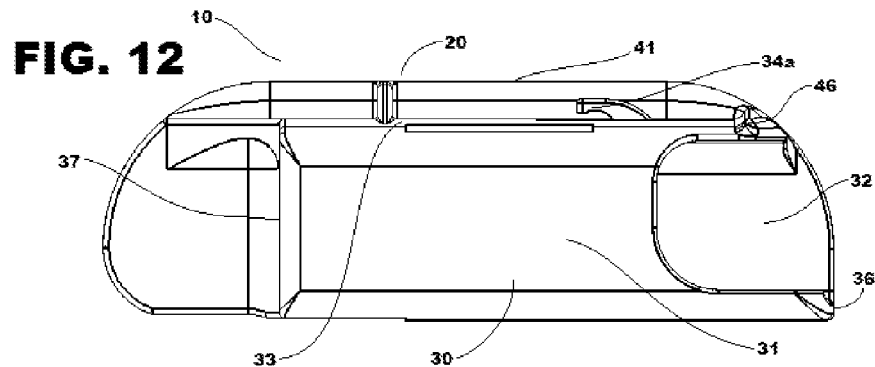
FIG. 12 is a side view of the connector depicted in FIG. 10, showing a side-saddle, or second, portion of the connector.
Figure 13:
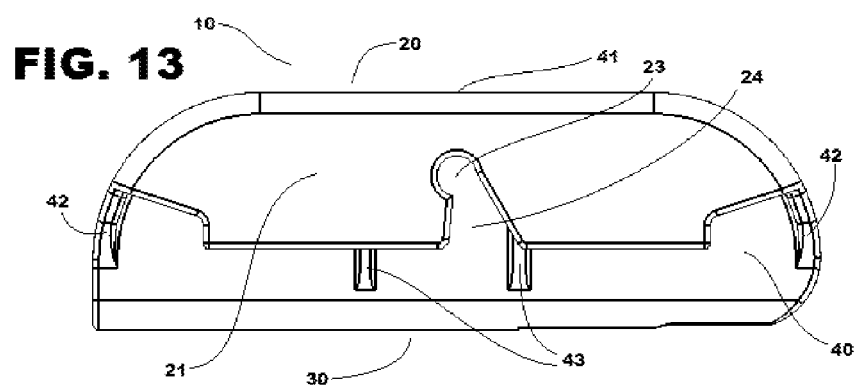
FIG. 13 is a side view of the connector depicted in FIG. 10, showing a mounting, or first, portion of the connector.
Figure 14:
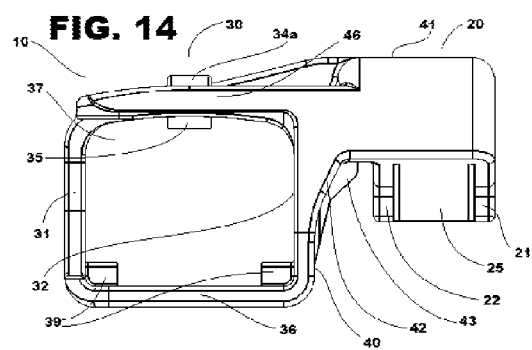
FIG. 14 is a front end view of the connector depicted in FIG. 10, showing an end where the wiper arm enters the connector when it is attached.
Figure 15:
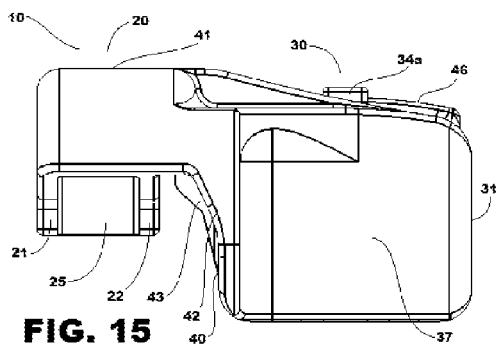
FIG. 15 is a back end view of the connector depicted in FIG. 10, showing an end opposite the opening where the wiper atm may enters the connector when it is attached.

As shown in FIGS. 10, 11 and 17, the bottom surface may include a front bar 36 and the bottom rails 38 that are part of an integrated, continuous surface. This increases the strength and structural stability of the bottom surface. Such a bottom surface may still have stops 39. In other embodiments, the bottom surface may form a bottom wall, with or without holes or recesses therein. Likewise in other embodiments, the bottom surface may have bottom rails that are joined together by bridging members (not shown). Similarly, as depicted in FIGS. 1-17 the top surface 33 of the side-saddle portion 30 may be provided additional holes or recesses. The side walls 21, 22, 31, 32, interim wall 40 or top surface 41 of the mounting portion 20 may also optionally be provided with holes or recesses as desired.

As discussed above FIGS. 18 and 19 depict examples of the types of arms that the disclosed connectors can secure. Persons of skill in the art will recognize that other types of arms can also be secured by these connectors.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the present invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from its scope. The description above of the exemplary embodiments is not intended to be limiting. While specific embodiments have been discussed herein to explain the invention, it will be understood by those of ordinary skill in the art that the descriptions herein are intended as illustrative, and not as limiting, and that variations in the embodiments can be made without departing from the spirit of the invention.

For example, the type of materials, the number, configuration or position of the various features can vary so long as they are capable of performing their intended function as described herein.

What is claimed is:

1. A wiper blade adapter having opposed first and second elongate ends, a top end and a bottom end spaced from and opposed to the top end, the adapter comprising:
    a side saddle portion including
        an elongate outer side saddle wall,
        an elongate inner side saddle wall opposed to the outer side saddle wall,
        a top wall provided at the top end of the adapter between the outer side saddle wall and the inner side saddle wall, the inner and outer side saddle walls together with the top wall thereby defining a receiving cavity, and
        a cantilever positioned on and substantially parallel to the top wall and having a locking tab projecting into the receiving cavity; and
    a mounting portion including
        an elongate outer mounting wall, and
        an elongate inner mounting wall opposed to the outer mounting wall, the inner and outer mounting walls together defining an elongate mounting passage,
    wherein the receiving cavity is configured to secure the adapter with a wiper arm, and wherein the mounting passage is configured to secure the adapter with a wiper blade.

2. The wiper blade adapter of claim 1, wherein the side saddle portion further includes a front bar provided between the inner and outer side saddle walls and positioned at the bottom end of the side saddle portion proximate the first end of the adapter.

3. The wiper blade adapter of claim 1, wherein the side saddle portion further includes an end wall provided between the inner and outer side saddle walls and positioned proximate the second end of the adapter.

4. The wiper blade adapter of claim 1, wherein the cantilever further comprises a distal portion and a proximate portion, the distal portion substantially coplanar with the top wall and the distal portion including an elevated tab.

5. The wiper blade adapter of claim 4, further comprising a depression provided on the top wall proximate to the elevated tab.

6. The wiper blade adapter of claim 1 further comprising a top surface provided at the top end of the adapter and extending from the outer mounting wall and terminating at the inner side saddle wall, wherein the elongate inner mounting wall projects from the top surface, and wherein the mounting passage is further defined by the top surface, the outer mounting wall, and the inner mounting wall.

7. The wiper blade adapter of claim 6, wherein an interim gap is provided between the inner side saddle wall and the inner mounting wall.

8. The wiper blade adapter of claim 1, wherein the mounting passage includes a wiper blade securing element comprising a rivet.

9. The wiper blade adapter of claim 1, wherein the side saddle portion further includes at least one reinforcing member.

10. A wiper blade assembly comprising:
a wiper blade; and
a wiper blade adapter for securing the wiper blade with a wiper arm, the wiper blade adapter having opposed first and second elongate ends, a top end and a bottom end from and opposed to the top end, the adapter comprising:
a side saddle portion including
an elongate outer side saddle wall,
an elongate inner side saddle wall opposed to the outer side saddle wall, a top wall provided at the top end of the adapter between the outer side saddle wall and the inner side saddle wall, the inner and outer side saddle walls together with the top wall thereby defining a receiving cavity, and
a cantilever positioned on and substantially parallel to the top wall and having a locking tab projecting into the receiving cavity; and
a mounting portion including
an elongate outer mounting wall, and
an elongate inner mounting wall opposed to the outer mounting wall, the inner and outer mounting walls together defining an elongate mounting passage
wherein the receiving cavity is configured to secure the adapter with a wiper arm, and wherein the mounting passage is configured to secure the adapter with the wiper blade.

11. The wiper blade assembly of claim 10, wherein the side saddle portion further includes a front bar provided between the inner and outer side saddle walls and positioned at the bottom end of the side saddle portion proximate the first end of the adapter.

12. The wiper blade assembly of claim 10, wherein the side saddle portion further includes an end wall provided between the inner and outer side saddle walls and positioned proximate the second end of the adapter.

13. The wiper blade assembly of claim 10, the cantilever of the wiper blade adapter further comprising a distal portion and a proximate portion, the distal portion substantially coplanar with the top wall and the distal portion including an elevated tab.

14. The wiper blade assembly of claim 13, the wiper blade adapter further comprising a depression provided on the top wall proximate to the elevated tab.

15. The wiper blade assembly of claim 10, the wiper blade adapter further comprising a top surface provided at the top end of the adapter and extending from the outer mounting wall and terminating at the inner side saddle wall, wherein the elongate inner mounting wall projects from the top surface, and wherein the mounting passage is further defined by the top surface, the outer mounting wall, and the inner mounting wall.

16. The wiper blade assembly of claim 15, wherein an interim gap is provided between the inner side saddle wall and the inner mounting wall.

17. A wiper blade adapter having opposed first and second elongate ends, a top end and a bottom end spaced from and opposed to the top end, the adapter comprising:
a side saddle portion including
an elongate outer side saddle wall,
an elongate inner side saddle wall opposed to the outer side saddle wall,
a top wall provided at the top end of the adapter between the outer side saddle wall and the inner side saddle wall, the inner and outer side saddle walls together with the top wall thereby defining a receiving cavity,
a pair of bottom rails, each bottom rail provided within the receiving cavity on a side saddle wall and positioned proximate to the bottom end, each bottom rail extending between the first and second ends, each bottom rail terminating at a distance from the first end and at another distance from the second end; and
a mounting portion including
an elongate outer mounting wall, and
an elongate inner mounting wall opposed to the outer mounting wall, the inner and outer mounting walls together defining an elongate mounting passage,
wherein the receiving cavity is configured to secure the adapter with a wiper arm, and wherein the mounting passage is configured to secure the adapter with a wiper blade.

18. The wiper blade adapter for claim 17, the side saddle portion further including a front bar provided between the inner and outer side saddle walls and positioned proximate to the first end of the adapter, the pair of bottom rails thereby spaced from the front bar.

19. The wiper blade adapter for claim 18, the side saddle portion further including an end wall provided between the inner and outer side saddle walls and positioned proximate the second end of the adapter, the pair of bottom rails thereby spaced from the end wall.

20. The wiper blade adapter for claim 17, the side saddle portion further including an end wall provided between the inner and outer side saddle walls and positioned proximate the second end of the adapter, the pair of bottom rails thereby spaced from the end wall.

* * * * *